(12) United States Patent
Huang et al.

(10) Patent No.: US 9,838,304 B2
(45) Date of Patent: Dec. 5, 2017

(54) SIGNALING FOR SERVICE FLOWS

(71) Applicant: Time Warner Cable Enterprises LLC, New York, NY (US)

(72) Inventors: Shan Huang, Ashburn, VA (US); Michael Kelsen, Centreville, VA (US); Ronald da Silva, Ashburn, VA (US); Tushar A. Nakhre, Herndon, VA (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 320 days.

(21) Appl. No.: 13/831,411

(22) Filed: Mar. 14, 2013

(65) Prior Publication Data

US 2014/0269713 A1 Sep. 18, 2014

(51) Int. Cl.
*H04L 12/725* (2013.01)
(52) U.S. Cl.
CPC .................................. *H04L 45/308* (2013.01)
(58) Field of Classification Search
CPC ............................ H04L 45/38; H04L 47/2441
USPC ........................................................ 370/392
See application file for complete search history.

(56) References Cited

U.S. PATENT DOCUMENTS

| 7,948,883 | B1* | 5/2011 | Croft, Jr. | ............. | H04L 12/2801 370/230 |
| 8,909,736 | B1* | 12/2014 | Bosch | ................. | H04L 67/1093 709/217 |
| 2003/0056217 | A1 | 3/2003 | Brooks | | |
| 2007/0165530 | A1* | 7/2007 | Dong | ............................ | 370/235 |
| 2010/0265956 | A1* | 10/2010 | Li | ................................. | 370/401 |
| 2010/0313236 | A1 | 12/2010 | Straub | | |
| 2011/0149979 | A1* | 6/2011 | Uttaro et al. | .................. | 370/401 |
| 2012/0250504 | A1* | 10/2012 | Finkelstein | .................... | 370/230 |
| 2014/0269716 | A1* | 9/2014 | Pruss et al. | .................... | 370/392 |

* cited by examiner

*Primary Examiner* — Hassan Kizou
*Assistant Examiner* — Abdullahi Ahmed
(74) *Attorney, Agent, or Firm* — Otterstedt, Ellenbogen & Kammer, LLP (57) ABSTRACT

A method for operating a Cable Modem Termination System (CMTS) device comprising storing a data structure correlating a plurality of border gateway protocol (BGP) attribute tags to packet header data, receiving a packet via a network of connected devices, determining a BGP attribute tag of the packet according to packet header data of said packet, determining an action to apply to the packet based on the data structure and the BGP attribute tag, and applying the action to the packet, wherein the action includes routing the packet in accordance with a BGP.

20 Claims, 7 Drawing Sheets

SIGNALING FOR SERVICE FLOWS

FIELD OF THE INVENTION

The present invention relates generally to the electrical, electronic, and computer arts, and more particularly relates to signaling for service flows.

BACKGROUND OF THE INVENTION

Data Over Cable Service Interface Specification (DOCSIS) is a telecommunications standard that enables high-speed data transfer over cable television (CATV) systems. DOCSIS is employed by cable television operators to provide data, including Internet and voice data, over a hybrid fiber-coaxial (HFC) infrastructure.

Within the HFC infrastructure, traffic (e.g., data packets) can be classified into separate DOCSIS service flows (SF). These service flows may be used to meet accounting, regulatory, QoS (Quality of Service), and other requirements.

More generally, a SF is a virtual construct between a Cable Modem Termination System (CMTS) and a CM (Cable Modem) for separating traffic from the same CM into different classifications. As such, each classification is statically defined and stored in each CM. Further, each SF can be associated with one or more classifications. The classifications are typically defined as a range of source/destination IP (Internet Protocol) blocks. For example, if IP video traffic is sent to, and received from, the 10.10.10/24 network block, then this signature can be used as a classification for a video service flow.

Unfortunately, the number of available classifications for service flows is limited to no more than 32 in most DOCSIS implementations.

SUMMARY OF THE INVENTION

Techniques are provided for signaling for service flows; for example, border gateway protocol (BGP) signaling for DOCSIS service flows. At least some embodiments enable a Cable Modem Termination System (CMTS) to classify upstream and/or downstream traffic based on BGP attributes. Unlike in a DOCSIS implementation, wherein classifiers are configured statically, exemplary embodiments of the invention facilitate dynamic classification of traffic, which beneficially increases system flexibility and scalability.

According to an exemplary embodiment of the present disclosure, a method for operating a Cable Modem Termination System (CMTS) device comprises storing a data structure correlating a plurality of border gateway protocol (BGP) attribute tags to packet header data, determining a BGP attribute tag of the packet according to packet header data of said packet, determining an action to apply to the packet based on the data structure and the BGP attribute tag, and applying the action to the packet, wherein the action includes routing the packet in accordance with a BGP.

According to an exemplary embodiment of the present disclosure, a Cable Modem Termination System (CMTS) device is interposed in a network between at least one computing device and a border gateway protocol (BGP) router, wherein the CMTS device applies BGP routing to packets through the network in accordance with a BGP. The CMTS device includes a persistent storage device storing a data structure correlating a plurality of BGP attribute tags to packet header data in a non-transitory manner, a memory, and at least one processor, coupled to said memory, and operative, when said data structure is loaded into said memory, to obtain, from said BGP router, at least one BGP attribute tag and apply an action to a packet, wherein said action includes routing said packet in accordance with said BGP and a BGP attribute tag associated with first packet header data of said packet.

According to an exemplary embodiment of the present disclosure, an apparatus includes means for storing a data structure correlating a plurality of border gateway protocol (BGP) attribute tags to packet header data, means for receiving a packet via a network of connected devices, means for determining a BGP attribute tag of said packet according to first packet header data of said packet, means for determining an action to apply to said packet based on said data structure and said attribute tag, and means for applying said action to said packet, wherein said action includes routing said packet in accordance with a BGP.

One or more exemplary embodiments of the invention or elements thereof can be implemented in the form of an article of manufacture including a machine readable medium that contains one or more programs and/or policies which when executed (e.g., on a router) implement such step(s); that is to say, a computer program product including a tangible computer readable recordable storage medium (or multiple such media) with computer usable program code for performing the method steps indicated stored therein in a non-transitory manner.

Furthermore, one or more exemplary embodiments of the invention or elements thereof can be implemented in the form of an apparatus (e.g., a router) including a memory and at least one processor that is coupled to the memory and operative to perform, or facilitate performance of, exemplary method steps.

In another aspect, one or more exemplary embodiments of the invention or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein.

One or more exemplary embodiments of the invention can provide substantial beneficial technical effects, including, for example:
  Expanding the number of possible traffic classifications well beyond the limitation of 32 classifiers currently available using a DOCSIS implementation, such as into the hundreds of thousands.
  Dynamic traffic classification, wherein a BGP router associates one or more attributes to a group of IP addresses (e.g., autonomous system (AS) number or community and the like). In this manner, the BGP is integrated into DOCSIS, such that partitioning the DOCSIS channels into multiple service flows is no longer necessary.

These and other features and advantages of the invention will become apparent from the following detailed description of illustrative embodiments thereof, which is to be read in connection with the accompanying drawings.

DETAILED DESCRIPTION OF PREFERRED EMBODIMENTS

Embodiments of the invention may be employed in a variety of settings. A non-limiting exemplary embodiment will be described within the context of a cable multiple system operator (MSO) providing one or more networks including one or more content-based networks. It is to be emphasized that one or more embodiments have applicability wherever traffic classification is needed in a network, and can be used in connection with many different kinds of networks besides content networks, such as networks carrying primarily or solely data.

Again, aspects of the invention are broadly applicable to using communities/attribute tags for traffic classification. More particularly, with Border Gateway Protocol (BGP) signaling, a CMTS (Cable Modem Termination System) can dynamically classify upstream traffic and/or downstream traffic based on BGP attributes (e.g., community), thereby beneficially eliminating the need for partitioning the DOCSIS channels into multiple service flows. In some embodiments, static classification can be replaced by the CMTS, which can be used to direct traffic into different service flows. In other embodiments, static classification can be replaced by the CMTS and the number of service flows in use can be reduced (for example, by grouping certain communities within a signal service flow).

The BGP can use a table of IP networks or "prefixes," which designate network reachability among autonomous systems (AS), wherein the table can be announced to one or more CMTS. BGP can be considered a path vector protocol, or a variant of a distance-vector routing protocol. The BGP can make routing decisions based on path, network policies, and/or rule-sets.

BGP communities are attribute tags (referred to herein interchangeably) that can be applied to incoming or outgoing prefixes to achieve some goal (e.g., counting traffic, shifting traffic to different spectrums, etc.). Exemplary communities include local preference adjustments, geographic or peer type restrictions, and AS prepending options. It should be understood that various additional communities are possible, for example, billing and accounting type communities, and that the present disclosure is not limited to exemplary embodiments presented herein.

Figure 1:
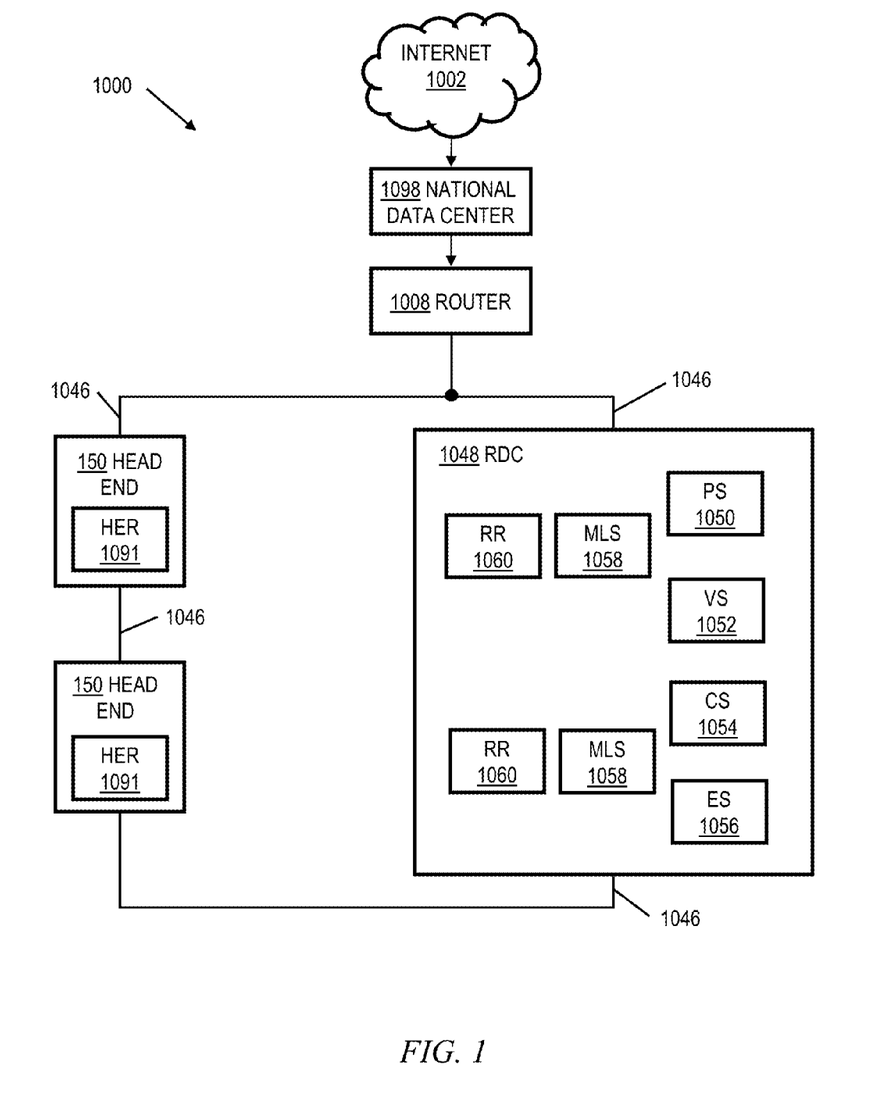
FIG. 1 is a block diagram of an exemplary system, within which one or more embodiments of the present invention can be implemented.

FIG. 1 shows an exemplary system 1000, according to an aspect of the invention. System 1000 includes a regional data center (RDC) 1048, and one or more divisions, represented by division head ends 150. RDC 1048 and head ends 150 are interconnected by a network 1046; by way of example and not limitation, a dense wavelength division multiplex (DWDM) network. Elements 1048, 150 on network 1046 may be operated, for example, by or on behalf of a cable MSO, and may be interconnected with a global system of interconnected computer networks that use the standardized Internet Protocol Suite (TCP/IP) (transfer control protocol/Internet protocol), commonly called the Internet 1002; for example, via router 1008 (e.g., a BGP router).

Head ends 150 may each include a head end router (HER) 1091 which interfaces with network 1046. Head end routers 1091 are omitted from FIGS. 2-4 for clarity.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center 1098 is provided in some instances; for example, between router 1008 and Internet 1002.

As noted, embodiments of the present disclosure may be employed in a variety of settings. In connection with the aforementioned non-limiting exemplary embodiment in the context of a cable multiple system operator (MSO) providing one or more networks including one or more content-based networks, certain non-limiting exemplary features of a content-based network, such as a video content network, will be presented in connection with FIGS. 2-4.

Figure 2:
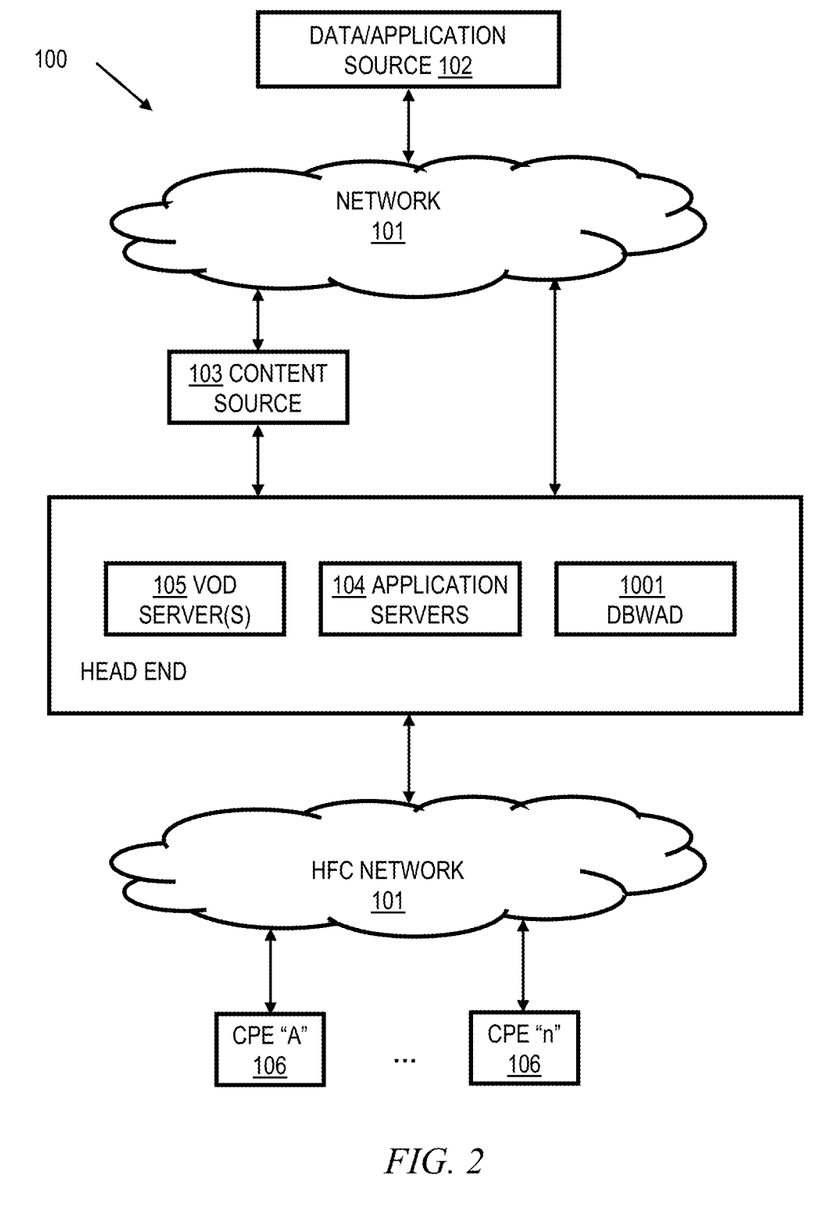
FIG. 2 is a functional block diagram illustrating an exemplary hybrid fiber-coaxial (HFC) network configuration.

FIG. 2 illustrates an exemplary content-based network configuration 100. In some instances, the head end, discussed further below, is located on network 1046 in FIG. 1. It is to be emphasized that embodiments of the present disclosure can be employed in many different contexts and the content-based network is depicted purely as a non-limiting example. The various components of the network 100 include (i) one or more data and application origination points 102; (ii) one or more content sources 103, (iii) one or more application distribution servers 104; (iv) one or more video-on-demand (VOD) servers 105, and (v) consumer (or customer) premises equipment (CPE) 106. Also included is a dynamic bandwidth allocation device (DBWAD) 1001 such as a global session resource manager, which is itself a non-limiting example of a session resource manager. The distribution server(s) 104, VOD servers 105, DBWAD 1001, and CPE(s) 106 are connected via a bearer (e.g., hybrid fiber cable (HFC)) network 101. An exemplary architecture is shown in FIG. 2 for illustrative brevity, although it will be recognized that comparable architectures with multiple origination points, distribution servers, VOD servers, and/or CPE devices (as well as different network topologies) may be utilized consistent with the invention. For example, the head-end architecture of FIG. 3 (described in greater detail below) may be used.

It should be noted at this point that in addition to a conventional HFC network or a switched digital network, other kinds of video content networks can be employed for network 101 (e.g., fiber-to-the-home (FTTH) or fiber-to-the-curb (FTTC); digital subscriber line (DSL); wireless networks such as Wi-Fi, WiMAX (Worldwide Interoperability for Microwave Access), 3GPP Long Term Evolution (LTE), various 4G standards; and the like). Again, for the avoidance of doubt, the HFC network details set forth herein are merely provided to show one non-limiting exemplary environment and it is to be emphasized that embodiments of the invention can be employed in many different situations where a CMTS device or the like is interposed between: (i) a network; and (ii) one or more devices to be protected such as, for example, one or more servers or the like.

The data/application origination point 102 comprises any medium that allows data and/or applications (such as a VOD-based or "Watch TV" application) to be transferred to a distribution server 104 (for example, over a suitable network, not separately numbered). This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill.

The application distribution server 104 comprises a computer system where such applications can enter the network system. Distribution servers per se are well known in the networking arts.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the customers' premises (or other appropriate locations) that can be accessed by a distribution server 104; for example, cable modem (CM), set-top terminal (STT), digital set-top box (DSTB), set-top box (STB), or simply "box," and the like.

Figure 3:
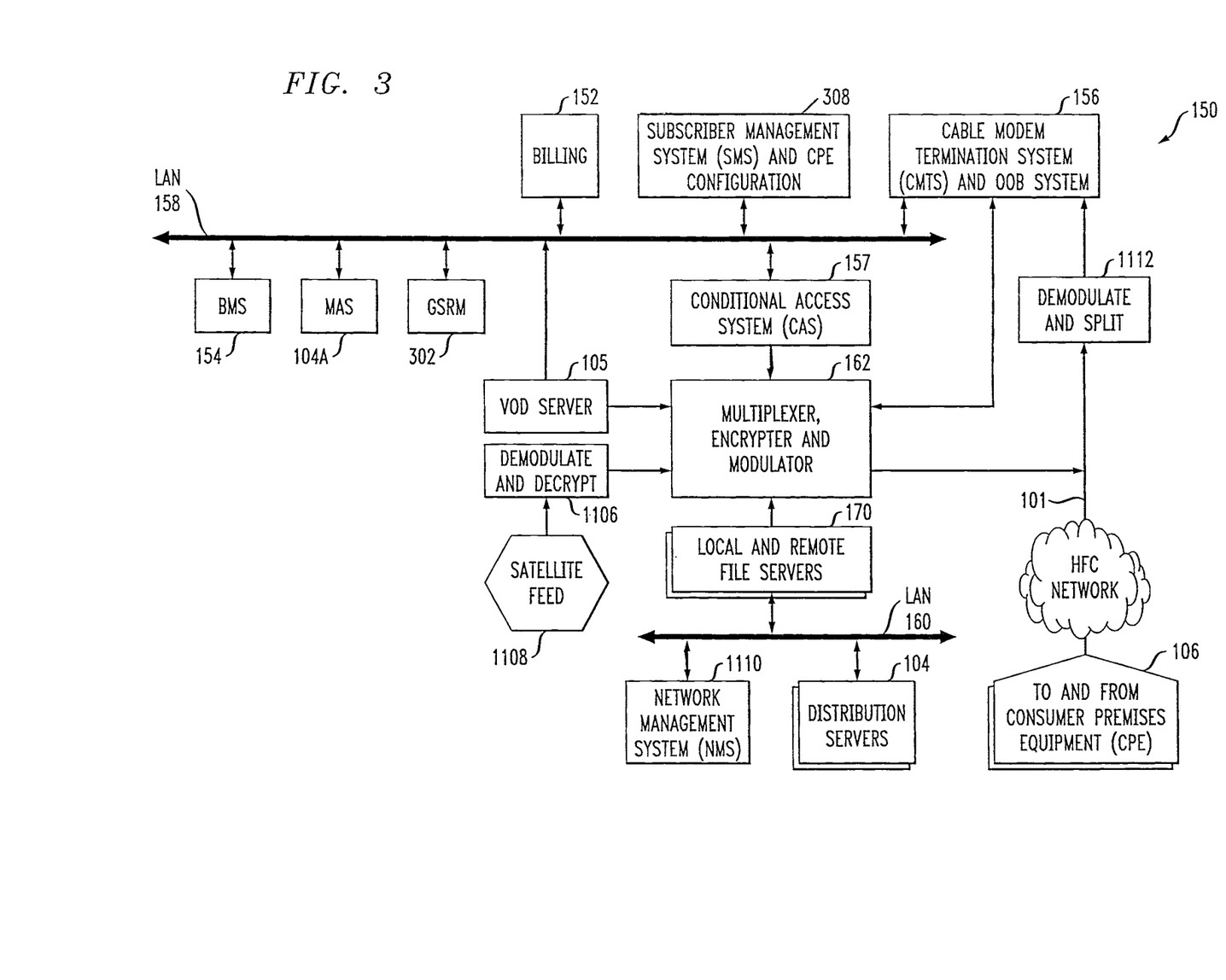
FIG. 3 is a functional block diagram illustrating one exemplary HFC cable network head-end configuration.

Referring now to FIG. 3, one exemplary embodiment of a head-end architecture is described. As shown in FIG. 3, the head-end architecture 150 comprises typical head-end components and services including billing module 152, subscriber management system (SMS) and CPE configuration management module 308, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator or multiple system operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (see FIG. 4) via a variety of interposed network components.

It should be noted at this point that with the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well-known Moving Pictures Experts Group 2 (MPEG-2) standard. The MPEG-2 standard specifies, among other things, the methodologies for video and audio data compression allowing for multiple programs, with different video and audio feeds, to be multiplexed in a transport stream traversing a single transmission channel. A digital TV receiver may be used to decode an MPEG-2 encoded transport stream, and extract the desired program therefrom.

The compressed video and audio data are typically carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only includes a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes. Other pertinent materials include the Data-Over-Cable Service Interface Specifications, IPv4 and IPv6 eRouter Specification (version 1.0 and any other versions), CM-SP-eRouter-I05-110210, and the Data-Over-Cable Service Interface Specifications, DOCSIS Set-top Gateway (DSG) Interface Specification, CM-SP-DSG-I17-110210, both available from Cable Television Laboratories, Inc., and both expressly incorporated herein by reference in their entireties for all purposes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups. Internet 1002 (FIG. 1) may in general include many different types of servers and may or may not include broadcast servers, VOD servers, or servers related to video or other content.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 302, a Mystro Application Server (MAS) 104A, and a business management system (BMS) 154, all of which are coupled to LAN 158. GSRM 302 is one specific form of a DBWAD 1001 (FIG. 2) and is a non-limiting example of a session resource manager (SRM).

Figure 4:
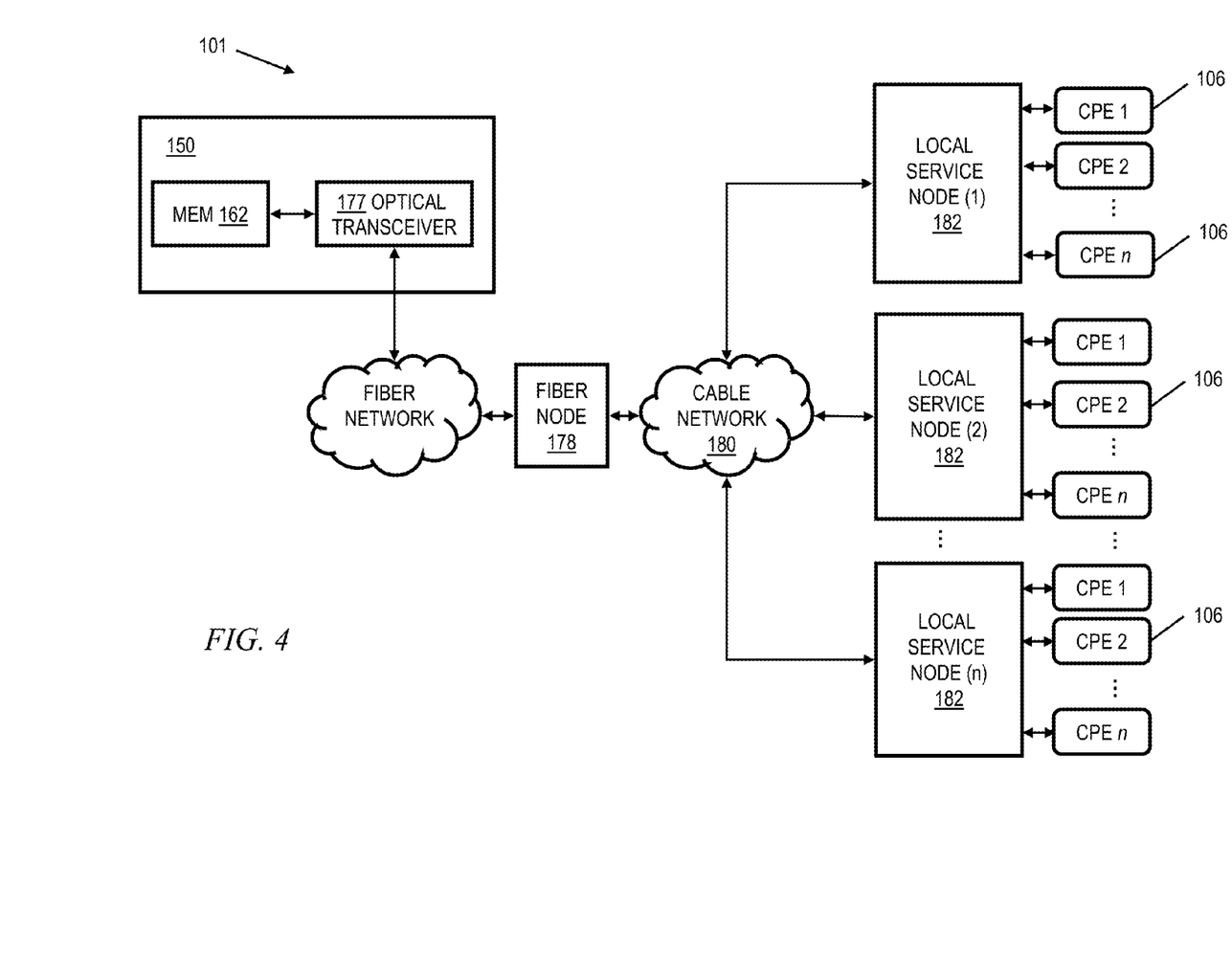
FIG. 4 is a functional block diagram illustrating one exemplary local service node configuration.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed to a fiber node 178, which further distributes the signals over a distribution network 180 to a plurality of local servicing nodes 182. This provides an effective 1:N expansion of the network at the local service end.

US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture useful with one or more embodiments of the present invention, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels, which are no longer watched by the subscribers in the neighborhood.

Note that reference is made herein, for brevity, to features of the "Brooks invention"—it should be understood that no inference should be drawn that such features are necessarily present in all claimed embodiments of Brooks.

The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is herein expressly incorporated by reference for all purposes, provides additional details on the aforementioned dynamic bandwidth allocation device.

Figure 5:
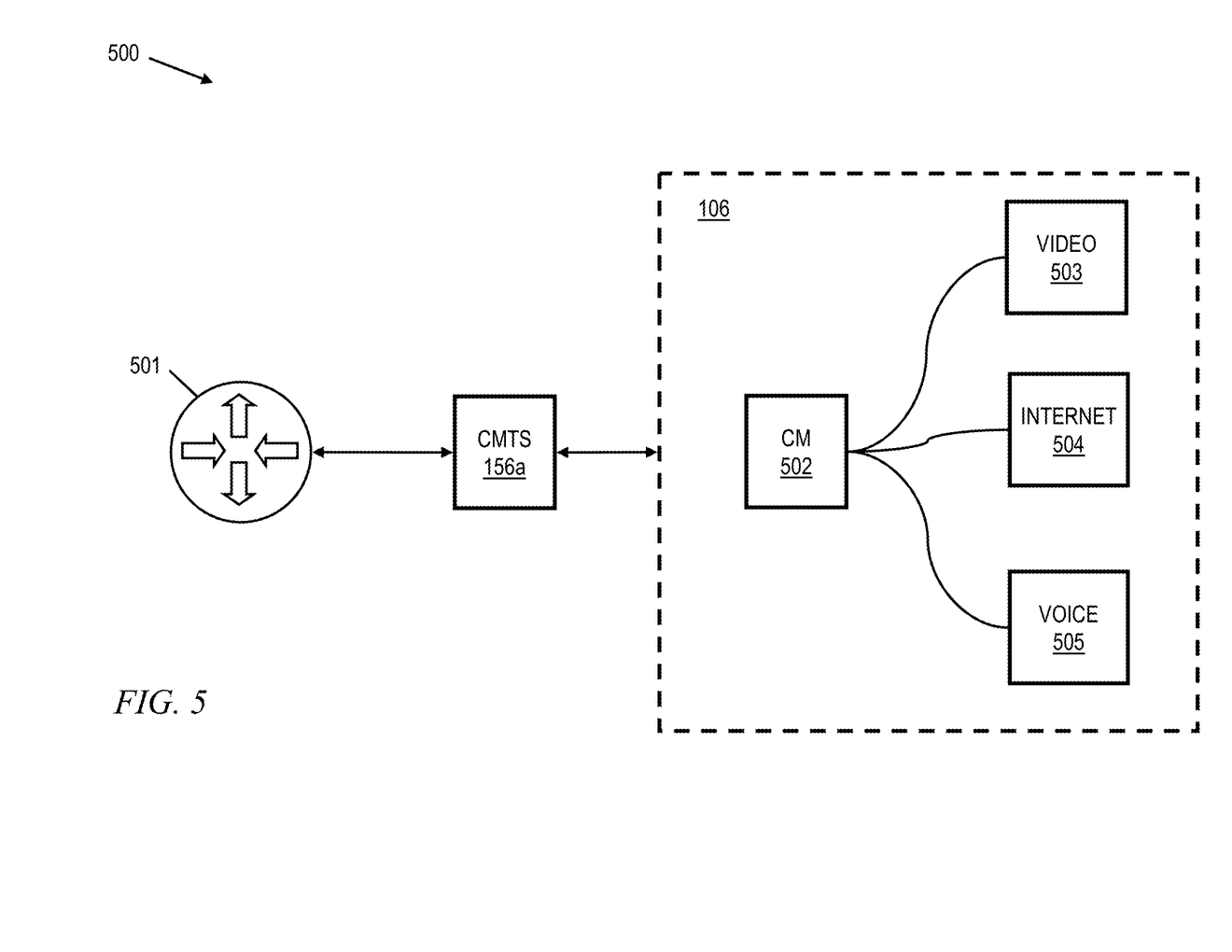
FIG. 5 is a system diagram illustrating signaling techniques for service flows in accordance with an aspect of the invention.

Reference should now be had to FIG. 5, which is a system diagram 500 illustrating signaling techniques in accordance with an exemplary embodiment of the present disclosure. In FIG. 5 elements similar to those in FIGS. 2-4 have the same reference character; the CMTS in FIG. 5 is designated as 156a.

As shown in FIG. 5, a BGP router 501 can be disposed upstream from the CMTS 156a and CPE 106. Although only one BGP router 501 and one CMTS 156a are shown for simplicity, it is to be understood that the system can be scaled include multiple BGP routers and/or multiple CMTS, such as to form a regional footprint. Since the classification (i.e., communities) are an integral component of the BGP, the addition, deletion, or modification of service flows can be implemented on-the-fly and then be pushed to the CMTS in real time, without a need to reset cable modems. It should be understood that one or more BGP routers can make an announcement in a regional network and push classification information to one, multiple, or all CMTS in that region.

The BGP router 501 can be implemented in hardware and/or software and controlled by the MSO or a third party (e.g., content provider). For this embodiment, from the standpoint of the CMTS 156a, traffic (e.g., video, Internet, voice data) received from the BGP router 501 is considered downstream traffic, directed towards subscribers. Alternatively, traffic sent to the BGP router 501 is considered upstream traffic. The BGP router 501 and CMTS 156a are configured to periodically exchange (i.e., advertise or announce) routing information for facilitating two-way communication of upstream and downstream traffic.

It should be understood that aspects of the invention can be implemented in connection with different types of transmissions, including unicast and multicast (e.g., for transmission to select cable modems).

One or more embodiments advantageously employ BGP for the assignment of attributes to routes. An MSO may, for example, have a BGP arrangement with third party entities (e.g., service or content providers, non-limiting examples of which are Google Inc. of Mountain View, Calif., USA and/or Yahoo! Inc. of Sunnyvale, Calif., USA) permitting announcements to be made over the network. That is, the BGP router 501 may be operated by the MSO or a third party entity.

BGP and DOCSIS, are two protocols implemented in the CMTS 156a. BGP can be used by the CMTS 156a to send traffic to and/or receive traffic from the Internet. DOCSIS can be used to send traffic to and/or receive traffic from subscribers and the CPE 106. BGP and DOCSIS need not interface or share state information between each other. According to an exemplary embodiment of the present disclosure, features of both protocols can be combined and function together homogeneously in the CMTS 156*a*. In accordance with one embodiment, when BGP is used as the routing protocol between routing devices (e.g., BGP router 501 and CMTS 156*a*), the protocol associates one or more attributes to a group of IP addresses (e.g., AS number or community). The CMTS 156*a* then uses these attributes for traffic classification, thereby eliminating the need for static classifiers.

More particularly, the BGP router 501 of the MSO or a third party entity announces routes to the CMTS 156*a*, wherein the routes include information associating a community/attribute tag to an IP address or a range of IP addresses (e.g., source and destination IP addresses of traffic), and can eliminate the burden of manual classification of the static configurations in DOCSIS and the subsequent rollout to each CPE. For example, the BGP router 501 can set different communities/attribute tags known to the CMTS 156*a* for traffic destined to a particular CM 502 or, in the aggregate, to a range of IP addresses (e.g., a subnet) including a plurality of CMs, etc. The communities/attribute tags can also be used to differentiate both upstream and downstream traffic based on the source and/or destination IP addresses of the traffic (described in more detail below with reference to the CMTS 156*a*). Each attribute tag is a unique indicator, e.g., a unique random number.

It should be understood that the community/attribute tags can be associated with other information in the packet header, for example, Type of Service (ToS) information and port numbers. More particularly, ToS information can be given in a defined field within the IP header. ToS information typically specifies the quality of service desired for a datagram. Referring to port numbers; these can be encoded in the packet header, and can be interpreted by the sending and receiving computers as well as the CMTS and BGP routers.

It should be understood that the community/attribute tags can be associated with other information in the packet, outside of the packet header.

Further, BGP can scale to hundreds of thousands of attribute tags. With a large number available attribute tags, a third party content provider can be permitted by the MSO to set a community in the routing, wherein one, many or all of the CMTS of the MSO will react dynamically. For example, the third party can set a community to receive preferential treatment (e.g., increased priority, bandwidth, etc.) for certain content, which is advantageous, for example, in QoS management applications and/or to comply with service level agreements (SLAs) and the like.

Referring now to the CMTS 156*a*, the CMTS 156*a* obtains routing information including communities/attribute tags from the announcements of the BGP router 501. The CMTS 156*a* can create a data structure (e.g., map) to correlate the communities/attribute tags to certain source and destination IP addresses for upstream and downstream packets. The CMTS 156*a* stores the data structure in memory in addition to the BGP process, and makes traffic forwarding decisions based on the source IP address and/or destination IP address of the packets in view of the data structure. For example, a video server having a particular IP address can be associated with an attribute tag for routing content to the video device 503 of the CPE 106. In another example, traffic routed to a particular destination, e.g., a video device 503, internet device 504, voice device 505, etc., can be treated differently.

The CMTS 156*a* can store the data structure (e.g., map) correlating communities/attribute tags and their associated actions in both upstream and downstream traffic. That is, in one or more embodiments, by using BGP, the CMTS 156*a* knows the BGP attribute tag associated with an IP address via the routing decision process prior to receiving any traffic (e.g., packetized data). There can be one or more actions per attribute. For one or more communities/attribute tags, an action can be applied individually to traffic to or from a particular device. For example, the CMTS 156*a* can maintain a unique state for a certain CPE device 106. For one or more communities/attribute tags, actions can be applied at an aggregate level for all CPE devices (e.g., redirecting traffic to a separate spectrum). In such cases, a limited state can be implemented per attribute in each direction. Additional communities/attribute tags may be discarded or stored in a CMTS for future use. Note here that BGP can support billion of unique communities.

According to an exemplary embodiment of the present disclosure, the BGP router 501 can remotely and dynamically signal one, many or all CMTS 156*a* to differentiate traffic from one or more different locations within the network for any number of reasons. The communities/attribute tags can be used for a verity of purposes, including accounting/billing, performance (e.g., priority/congestion control), admission control, as well as traffic management, spectrum optimization, and the like.

With BGP, the CMTS 156*a* can classify upstream and downstream traffic based on common BGP communities/attribute tags. The BGP router 501 announcements can be handled dynamically at the CMTS without requiring roll-out to the CPE 106.

Referring now to exemplary implementations of embodiments of the present disclosure, in a downstream traffic example, a byte counter can be maintained by the CMTS for every customer when certain Internet traffic (associated with a first community/attribute tag) is received from a BGP router. This counter can then be exported directly to an external billing system or the internal IPDR (IP Detail Record) process for accounting. When voice traffic (associated with a second community/attribute tag) is received from the BGP router, the traffic can be prioritized on a DOCSIS channel ahead of other traffic. When video traffic (associated with a third community/attribute tag) is received from the BGP router, the traffic can be shifted to be sent over a different radio frequency (RF) spectrum.

In an upstream traffic example, a byte counter can be maintained by the CMTS for every customer when Internet traffic (associated with a fourth community/attribute tag) is received from an RF interface. The counter can then be exported directly to an external billing system or the internal IPDR process for accounting. The CMTS can achieve QoS in the upstream direction by signaling each affected CM in advance via DOCSIS messaging. Similarly, the CMTS can apply regulatory requirements in the upstream direction by signaling the CM in advance via DOCSIS messaging.

Figure 6:
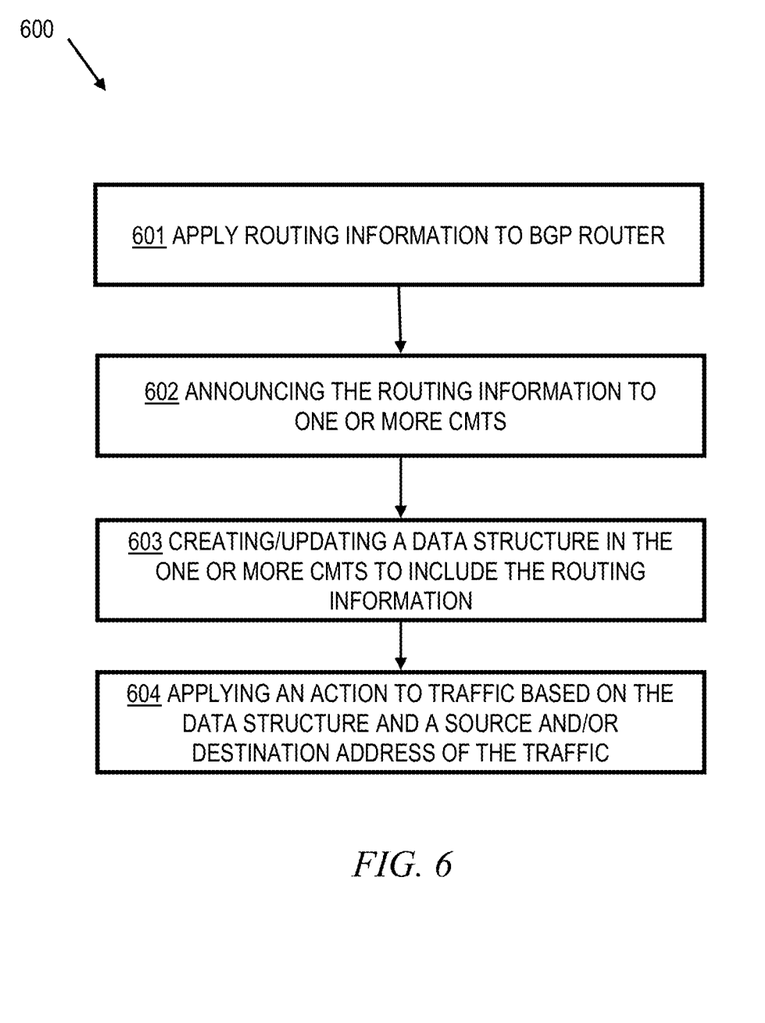
FIG. 6 is a flow chart of exemplary method steps in accordance with an aspect of the invention.

Referring to FIG. 6 showing an exemplary method 600 according to an embodiment of the present disclosure, an entity (e.g., MSO or third party) applies routing information to a BGP router 601 in a network. The routing information includes communities/attribute tags correlated to certain source and destination IP addresses for upstream and downstream packets. The BGP router announces the routing information to one or more CMTS in the network 602. The CMTS receives the routing information 603 and updates/creates a data structure to include the communities/attribute tags correlated to the certain source and destination IP addresses for upstream and downstream packets. The CMTS stores the data structure in memory, and applies at least one action (e.g., making traffic forwarding decisions, counting traffic) to the packet based on an attribute tag determined for the packet based on the source IP address and/or destination IP address of the packets in view of the data structure 604.

It should be noted that one or more embodiments are equally applicable to Internet Protocol version 4 (IPv4) and Internet Protocol version 6 (IPv6), and will work in a similar manner for both IPv4 and IPv6. One or more embodiments identify a range of similar clients to allow or disallow access to infrastructure of an MSO or the like.

It should be noted that for IPv4 using the 5-tuple according to the prior art, the source and destination addresses, and type of protocol (TCP/UDP) are part of the packet header; and the source port and destination port are part of the TCP/UDP header within the data of the IP packet. Similarly, for IPv6 using the 5-tuple according to the prior art, the source and destination addresses, and next header field (TCP/UDP) are part of the packet header; and the source port and destination port are part of the TCP/UDP header within the data of the IP packet.

Recapitulation

Attention should now again be given to FIGS. 5 and 6. By way of review, in one or more embodiments, BGP router 501 includes logic, which based on network blocks or IP addresses, classifies certain traffic with certain BGP attributes. CMTS 156a includes new software and a new data structure. The data structure provides a map with information regarding how to handle traffic with each of the different attributes. In one or more embodiments, before the CMTS ever receives a packet, it receives the attribute information for the packet. Furthermore, in one or more embodiments, the actions to be applied to a packet can be based on the source and/or destination IP addresses; the attribute information is not in the packet per se. The new logic in the CMTS 156a utilizes the map to apply the appropriate action to the packet.

One or more embodiments in essence "merge" the BGP and DOCSIS protocols and employ a BGP community attribute to separate traffic instead of relying on static classifiers.

Advantageously, one or more exemplary embodiments provide the ability to remotely and dynamically signal one, many or all CMTSs 156a to treat traffic in a different fashion for a variety of reasons from one or many different locations within the network. This is carried out via router(s) 501 making an announcement as to how to classify particular traffic. The aforementioned reasons could include, for example, accounting and/or billing, performance (priority and/or congestion control), admission control, as well as traffic management (sending the data over different physical spectrum (or channels), setting a rate limit on the traffic) and spectrum optimization. This provides an improvement over the current state of the art, which is based on the CMTS 156 using static configurations for a limited number of flows.

Given the discussion thus far, it will be appreciated that, in general terms, an exemplary method, according to an exemplary aspect of the invention, includes storing a data structure correlating a plurality of border gateway protocol (BGP) attribute tags to packet header data, receiving a packet via a network of connected devices, determining a BGP attribute tag of the packet according to packet header data of the packet, determining an action to apply to the packet based on the data structure and the BGP attribute tag, and applying the action to the packet, wherein the action includes routing the packet in accordance with a BGP. Furthermore, a Cable Modem Termination System (CMTS) device, according to an exemplary aspect of the invention, interposition in a network between at least one computing device and a border gateway protocol (BGP) router, applies BGP routing to packets through the network in accordance with a BGP. The CMTS device includes a persistent storage device storing a data structure correlating a plurality of BGP attribute tags to packet header data in a non-transitory manner, a memory, and at least one processor, coupled to the memory, and operative, when the data structure is loaded into the memory, to obtain, from the BGP router, at least one BGP attribute tag, and apply an action to a packet, wherein the action includes routing the packet in accordance with the BGP and a BGP attribute tag associated with packet header data of the packet.

In any case, the statement that the at least one processor is operative to carry out one or more method steps when a policy file (discussed further herein) is loaded into memory should be broadly construed; it may be that only the step of applying the routing policy is directly influenced by the policy file; steps such as routing and noting the BGP attribute tag may be carried out by the processor using hardware or a combination of hardware and software other than the policy file.

As noted elsewhere herein, aspects of the invention also contemplate an apparatus including means for carrying out any one, some, or all of the method steps. The means broadly include a BGP router and CMTS device. Thus, means for routing packets from at least one internet protocol (IP) address in accordance with BGP can include a stand-alone BGP router or a BGP router implemented by another device.

System and Article of Manufacture Details

Exemplary embodiments of the invention can employ hardware aspects or a combination of hardware and software aspects. Software includes but is not limited to firmware, resident software, microcode, etc. One or more exemplary embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code that is stored thereon in a non-transitory manner and which is configured to implement the method steps indicated, when run on one or more processors. Furthermore, one or more exemplary embodiments of the invention or elements thereof can be implemented in the form of an apparatus including a memory and at least one processor that is coupled to the memory and operative to perform, or facilitate performance of, exemplary method steps.

In another aspect, one or more exemplary embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a non-transitory manner on a tangible computer-readable recordable storage medium (or multiple such media). Appropriate interconnections via bus, network, and the like can also be included.

Many exemplary aspects of the invention can be implemented, or at least facilitated, for example, by a CMTS with suitable hardware and/or software layers and/or policies to implement logic as described herein.

Figure 7:
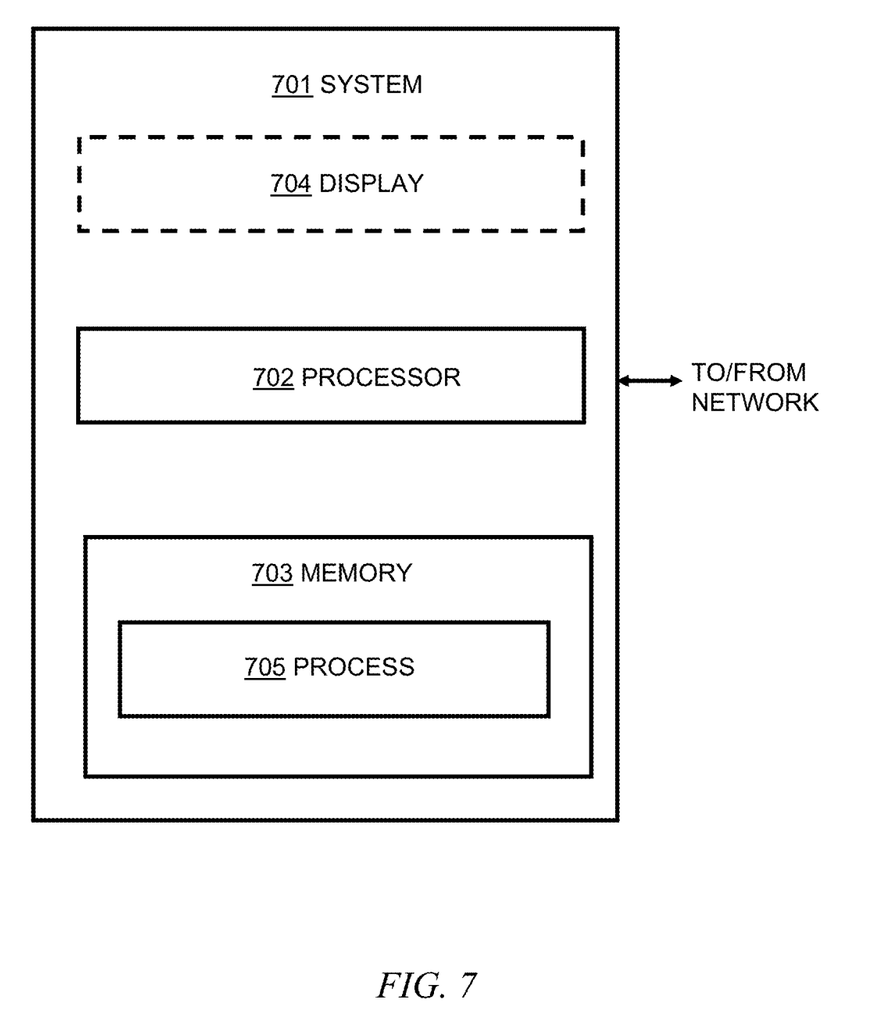
FIG. 7 is a block diagram of an exemplary computer system useful in implementing at least a portion of one or more embodiments of the invention.

FIG. 7 is a block diagram of a data processing system 701, processor 702 of which is representative of processors associated with servers, clients, set top terminals 106, DBWAD, SRM, GSRM, MAS 104A, and various elements with processing capability depicted in the figures.

As shown in FIG. 7, memory 703 configures the processor 702 to implement one or more methods, steps, and functions (collectively, shown as process 705 in FIG. 7). The memory 703 could be distributed or local and the processor 702 could be distributed or singular. The memory 703 could be implemented as an electrical, magnetic or optical memory, or any combination of these or other types of storage devices. It should be noted that if distributed processors are employed, each distributed processor that makes up processor 702 generally contains its own addressable memory space. It should also be noted that some or all of computer system 701 can be incorporated into an application-specific or general-use integrated circuit. For example, one or more processes could be implemented in hardware in an ASIC rather than using firmware. Display 704 is representative of a variety of possible input/output devices (e.g., mice, keyboards, printers, etc.).

As is known in the art, part or all of one or more aspects of the methods and apparatus discussed herein may be distributed as an article of manufacture that itself includes a computer readable medium having computer readable code means embodied thereon (e.g., with instructions and/or policies to be stored in storage and loaded into memory to cause processor to implement the routing aspects with respect to traffic on ports). The computer readable medium may be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a processor to read instructions and data, such as magnetic variations on a magnetic medium or height variations on the surface of a compact disk. As used herein, a tangible computer-readable recordable storage medium is intended to encompass a recordable medium which stores instructions and/or data in a non-transitory manner, examples of which are set forth above, but is not intended to encompass a transmission medium or disembodied signal.

The computer systems and servers, and/or router, described herein each contain a memory that can configure associated processors to implement certain methods, steps, and functions disclosed herein. The memories could be distributed or local and the processors could be distributed or singular. The memories could be implemented as an electrical, magnetic or optical memory, or any combination of these or other types of storage devices. Moreover, in at least some instances, the term "memory" encompasses any information able to be read from or written to an address in the addressable space accessed by an associated processor. With this definition, information on a network is still within a memory because the associated processor can retrieve the information from the network.

Thus, elements of one or more exemplary embodiments of the present invention can make use of computer and/or microprocessor technology with appropriate instructions to implement method steps described herein.

As used herein, including the claims, a "server" includes a physical data processing system (for example, system 701 as shown in FIG. 7) running a server program. It will be understood that such a physical server may or may not include a display, keyboard, or other input/output components.

Furthermore, it should be noted that any of the methods described herein can include an additional step of providing a system comprising one or more distinct software modules embodied on one or more tangible computer readable storage media (e.g., in storage or on another tangible medium for ultimate loading into storage). All the modules (or any subset thereof) can be on the same medium, or each can be on a different medium, for example. The modules can include, for example, a routing policy module; any or all of the software components shown in the figures can be implemented with suitable modules. The method steps can then be carried out using the distinct software module(s) of the system, as described above, executing on the one or more hardware processors. The same then form a particular machine, for example:

a router configured in accordance with BGP;

a CMTS device which is coupled to the router and which carries out traffic classification logic under the influence of the classification module (e.g., a policy file on a storage medium); the traffic classification logic may itself be implemented in hardware or a combination of hardware and software; and the aforementioned traffic classification module.

Further, a computer program product can include a tangible computer-readable recordable storage medium with code adapted to be executed to carry out one or more method steps described herein, including the provision of the system with the distinct software module(s). In one or more embodiments, the code is stored in a non-transitory manner.

Non-limiting examples of languages that may be used include markup languages (e.g., hypertext markup language (HTML), extensible markup language (XML), standard generalized markup language (SGML), and the like), C/C++, assembly language, Pascal, Java, EBIF—Extended Binary Interchange Format language, UNIX shell scripts (for example, to generate information to supply to the GSRM), and the like. Note that EBIF would typically only be employed in connection with a set-top box. RTSP and/or RPC can be employed for interface protocols, for example. Furthermore, non-limiting examples of useful database software include Access® software (registered mark of Microsoft Corporation, Redmond, Wash., USA); Oracle® software (registered mark of Oracle International Corporation, 500 Oracle Parkway, Redwood City, Calif. 94065, USA); Informix® software (registered mark of International Business Machines Corporation, Armonk, N.Y., USA); and structured query language (SQL) software available from many sources, including Microsoft Corporation, Redmond, Wash., USA).

Accordingly, it will be appreciated that one or more exemplary embodiments of the invention can include a computer program product including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein; e.g., in connection with FIGS. 5 and 6.

System(s) have been described herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors such as digital signal processors (DSPs). Thus, any blocks, components, sub-blocks, sub-components, modules and/or sub-modules may be realized by one or more DSPs. A DSP typically comprises a combination of digital logic devices and other components, which may be a state machine or implemented with a dedicated microprocessor or micro-controller running a software program or having functions programmed in firmware.

Although exemplary embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
   storing a data structure correlating a plurality of border gateway protocol (BGP) attribute tags to packet header data;
   receiving a packet via a network of connected devices;
   determining a BGP attribute tag of said packet according to packet header data of said packet;
   determining an action to apply to said packet based on said data structure and said BGP attribute tag, wherein determining said action to apply to said packet further comprises determining a service flow according to said data structure, wherein said data structure specifies different service flows for different BGP attribute tags including specifying said service flow for said BGP attribute tag; and
   applying said action to said packet, wherein said action includes routing said packet into said service flow in accordance with a BGP.

2. The method of claim 1, wherein determining said BGP attribute tag of said packet further comprises:
   determining at least one of a source internet protocol address and/or a destination internet protocol address specified in said packet header data of said packet; and
   determining said BGP attribute tag according to a correlation specified by said data structure and said at least one of said source internet protocol address and said destination internet protocol address.

3. The method of claim 1, wherein determining said BGP attribute tag of said packet further comprises:
   determining a Type of Service (ToS) specified in said packet header data of said packet; and
   determining said BGP attribute tag according to a correlation specified by said data structure and said ToS.

4. The method of claim 1, wherein determining said BGP attribute tag of said packet further comprises:
   determining at least one port number specified in said packet header data of said packet; and
   determining said BGP attribute tag according to a correlation specified by said data structure and said at least one port number.

5. The method of claim 1, wherein said packet in said service flow is prioritized as compared to traffic in another service flow.

6. The method of claim 1, wherein said service flow occupies a certain channel, different from a channel of another service flow.

7. The method of claim 1, wherein said service flow is associated with a monetary rate different than another monetary rate associated with another service flow.

8. A Cable Modem Termination System (CMTS) device interposition in a network between at least one computing device and a border gateway protocol (BGP) router, wherein the CMTS device applies BGP routing to packets through the network in accordance with a BGP, said CMTS device comprising:
   a persistent storage device storing a data structure correlating a plurality of BGP attribute tags to packet header data in a non-transitory manner;
   a memory; and
   at least one processor, coupled to said memory, and operative, when said data structure is loaded into said memory, to:
      obtain, from said BGP router, at least one BGP attribute tag; and
      apply an action to a packet, wherein said action includes routing said packet into a service flow in accordance with said data structure, said BGP and a BGP attribute tag, among said at least one BGP attribute tag, which is associated with packet header data of said packet.

9. The CMTS device of claim 8, wherein at least one of said plurality of BGP attribute tags is associated with at least one of a source internet protocol address and/or a destination internet protocol address specified in said packet header data of said packet.

10. The CMTS device of claim 8, wherein at least one of said plurality of BGP attribute tags is associated with Type of Service (ToS) information specified in said packet header data of said packet.

11. The CMTS device of claim 8, wherein at least one of said plurality of BGP attribute tags is associated with at least one port number specified in said packet header data of said packet.

12. The CMTS device of claim 8, wherein applying said action to said packet further comprises routing said packet into said service flow selected from among a plurality of service flows, wherein said packet in said service flow is prioritized as compared to traffic in another service flow.

13. An apparatus comprising:
   means for storing a data structure correlating a plurality of border gateway protocol (BGP) attribute tags to packet header data;
   means for receiving a packet via a network of connected devices; and
   a cable modem termination system using BGP signaling in determining a BGP attribute tag of said packet according to packet header data of said packet, determining an action to apply to said packet based on said data structure and said attribute tag, and applying said action to said packet, wherein said action includes routing said packet into a service flow in accordance with a BGP, wherein said cable modem termination system using BGP signaling in determining said action to apply to said packet further determines said service flow according to said data structure, wherein said data structure specifies different service flows for different BGP attribute tags and routes said packet into said service flow.

14. The apparatus of claim 13, wherein said BGP attribute tag of said packet is determined according to at least one of a source IP address and/or a destination IP address specified in said packet header of said packet.

15. The apparatus of claim 13, wherein said BGP attribute tag of said packet is determined according to Type of Service (ToS) information specified in said packet header of said packet.

16. The apparatus of claim 13, wherein said BGP attribute tag of said packet is determined according to at least one port number specified in said packet header of said packet.

17. The apparatus of claim 13, wherein said packet in said service flow is prioritized as compared to traffic in another service flow.

18. The apparatus of claim 13, wherein said service flow occupies a certain channel, different from a channel of another service flow.

19. The apparatus of claim 13, wherein said service flow is associated with a monetary rate different than another monetary rate associated with another service flow.

20. A method comprising:
storing a data structure correlating a plurality of border gateway protocol (BGP) attribute tags to packet header data;
receiving a packet via a network of connected devices;
determining a BGP attribute tag of said packet according to packet header data of said packet, wherein determining said BGP attribute tag of said packet further comprises:
determining a Type of Service (ToS) specified in said packet header data of said packet; and
determining said BGP attribute tag according to a correlation specified by said data structure and said ToS;
determining an action to apply to said packet based on said data structure and said BGP attribute tag; and
applying said action to said packet, wherein said action includes routing said packet into a service flow in accordance with a BGP.

* * * * *